(12) United States Patent
D'Amico

(10) Patent No.: US 10,017,318 B2
(45) Date of Patent: Jul. 10, 2018

(54) HAIR COLOR (OR DYE) STORAGE, DISPENSING AND MEASUREMENT (OR MEASURING) SYSTEM

(71) Applicant: Stephen D'Amico, Hermosa Beach, CA (US)

(72) Inventor: Stephen D'Amico, Hermosa Beach, CA (US)

(*) Notice: Subject to any disclaimer, the term of this patent is extended or adjusted under 35 U.S.C. 154(b) by 0 days.

(21) Appl. No.: 15/090,583

(22) Filed: Apr. 4, 2016

(65) Prior Publication Data

US 2016/0213125 A1 Jul. 28, 2016

Related U.S. Application Data

(63) Continuation-in-part of application No. 14/155,353, filed on Jan. 14, 2014, now Pat. No. 9,301,587.

(60) Provisional application No. 61/752,398, filed on Jan. 14, 2013, provisional application No. 61/887,901, filed on Oct. 7, 2013.

(51) Int. Cl.
*B01F 15/04* (2006.01)
*B65D 83/00* (2006.01)
*A45D 19/00* (2006.01)
*B65D 37/00* (2006.01)
*B01F 13/00* (2006.01)
*G01F 11/02* (2006.01)
*A61Q 5/00* (2006.01)

(52) U.S. Cl.
CPC ......... *B65D 83/0055* (2013.01); *A45D 19/00* (2013.01); *A61Q 5/00* (2013.01); *B01F 13/0023* (2013.01); *B01F 15/0462* (2013.01); *B65D 37/00* (2013.01); *B65D 83/0033* (2013.01); *G01F 11/027* (2013.01); *A45D 2019/0066* (2013.01); *A45D 2200/055* (2013.01); *A45D 2200/058* (2013.01); *A45D 2200/25* (2013.01)

(58) Field of Classification Search
CPC ............ B65D 83/0055; B65D 83/0033; B65D 37/00; A61Q 5/00; B01F 15/0462; B01F 13/0023; A45D 19/00; A45D 2200/055; A45D 2200/058; A45D 2200/25; A45D 2019/0066
See application file for complete search history.

(56) References Cited

U.S. PATENT DOCUMENTS 2,906,300 A * 9/1959 Becher ................... A45D 34/04
141/18
4,473,097 A * 9/1984 Knickerbocker .. B65D 81/3211
141/113

(Continued)

*Primary Examiner* — Nicolas A Arnett
(74) *Attorney, Agent, or Firm* — Edwin Tarver

(57) ABSTRACT

An apparatus and system for preparing a hair coloring includes as graduated syringe and a container filled with a pigmented hair dye. The container includes an air-tight chamber and an opening, and also includes an engagement mechanism for installing the container on a rack for support. An air-tight reclosing seal at the opening allows the syringe to engage the air-tight reclosing seal, and extract the hair dye from the air-tight chamber. When the syringe is disengaged from the container, the air-tight reclosing seal closes off the air-tight chamber and permitting a known quantity of the hair dye to be withdrawn from the container into the syringe, allowing an accurate and repeatable quantity of hair dye to be dispensed from the container.

22 Claims, 14 Drawing Sheets

(56) References Cited

U.S. PATENT DOCUMENTS

| | | | | |
|---|---|---|---|---|
| 4,712,593 | A * | 12/1987 | Zulauf | B01F 15/0201 |
| | | | | 141/113 |
| 5,554,197 | A * | 9/1996 | Assini | A45D 19/00 |
| | | | | 132/208 |
| 6,089,408 | A * | 7/2000 | Fox | A45D 19/02 |
| | | | | 141/104 |
| 6,202,895 | B1 * | 3/2001 | Fox | A45D 19/02 |
| | | | | 141/104 |
| 6,789,704 | B2 * | 9/2004 | Hennessey | B65D 83/0055 |
| | | | | 222/105 |
| 6,935,386 | B2 * | 8/2005 | Miller | B01F 13/1055 |
| | | | | 141/104 |
| 7,185,789 | B2 * | 3/2007 | Mink | B01F 13/1058 |
| | | | | 222/135 |
| 7,407,055 | B2 * | 8/2008 | Rodriguez | A45D 19/0008 |
| | | | | 132/208 |
| 7,624,769 | B2 * | 12/2009 | Bartholomew | G07F 11/165 |
| | | | | 141/104 |
| 7,654,416 | B2 * | 2/2010 | Buining | B01F 13/1058 |
| | | | | 222/135 |
| 7,963,303 | B2 * | 6/2011 | Saranow | A45D 44/005 |
| | | | | 141/104 |
| 7,972,056 | B2 * | 7/2011 | Lontoc | B01F 7/161 |
| | | | | 366/150.1 |
| 8,336,582 | B2 * | 12/2012 | Saranow | A45D 19/00 |
| | | | | 141/104 |
| 8,393,363 | B2 * | 3/2013 | Saranow | A45D 44/005 |
| | | | | 141/104 |
| 8,567,455 | B2 * | 10/2013 | Saranow | A45D 19/00 |
| | | | | 141/104 |
| 8,897,915 | B2 * | 11/2014 | Saranow | G06Q 10/10 |
| | | | | 700/233 |
| 8,977,389 | B2 * | 3/2015 | Witchell | G01F 1/42 |
| | | | | 700/233 |
| 9,177,339 | B2 * | 11/2015 | Saranow | A45D 19/00 |
| 9,301,587 | B2 * | 4/2016 | D'Amico | A45D 19/00 |
| 9,524,605 | B2 * | 12/2016 | Saranow | A45D 19/00 |
| 2004/0159673 | A1 * | 8/2004 | Hennessey | B65D 83/0055 |
| | | | | 222/105 |
| 2005/0211261 | A1 * | 9/2005 | Capristo | A45D 19/02 |
| | | | | 132/112 |
| 2010/0294809 | A1 * | 11/2010 | Baier | A61C 17/227 |
| | | | | 222/94 |
| 2013/0123973 | A1 * | 5/2013 | Saranow | A45D 19/00 |
| | | | | 700/233 |
| 2014/0196221 | A1 * | 7/2014 | D'Amico | A45D 19/00 |
| | | | | 8/405 |
| 2016/0163146 | A1 * | 6/2016 | Saranow | A45D 19/00 |
| | | | | 700/233 |

* cited by examiner

HAIR COLOR (OR DYE) STORAGE, DISPENSING AND MEASUREMENT (OR MEASURING) SYSTEM

This application claims the benefit of the filing date of provisional application No. 61/752,398, filed on Jan. 14, 2013, and provisional application No. 61/887,901 filed on Oct. 7, 2013.

BACKGROUND

Hair coloring systems currently available on the market typically comprise a series of capped dye tubes, such as collapsible aluminum tubes, each containing a different color high-viscosity paste, or a bottle-type container holding a liquid. During the hair coloring process, a stylist dispenses the desired amount of a particular base pigment into a mixing receptacle. Additional pigments must be dispensed and mixed with the base to achieve a desired color. A developer or fixing agent will be added as well. Once the pigments and developer dispensed and blended, the mixture may be applied to a client's hair.

These hair coloring systems have several drawbacks. When adding color from a tube, a user is prompted to "squeeze to a line," wherein it is impossible to identify small amounts, such as milliliters. Because hair dye is obtained by hand from tubes or bottles, it is impossible to know the quantity of a particular pigment dispensed. Dyes must be measured accurately since a change of even 0.1 ml can alter the hue of a color mixture from one batch to the next. Independent studies have found that the best efforts using tube markings were only accurate to +/−50% of the total volume. The accuracy of color dispensed with a syringe fitted at its open end with a nozzle or tubing is to within +/−1% of the total volume. Accurate measuring equipment, which is common in a laboratory setting, is rarely found in conventional salons. For this reason, precise reformulation/duplication of a color can be difficult if not impossible.

The bottles and tubes from which colors are dispensed are also not easily organized in a salon setting. Due to the speed at which hair professionals work and the numerous clients on which they work over the course of a given day, containers usually end up haphazardly thrown in drawers or on shelves, forcing stylists to search for a desired color among many disorganized dyes.

Furthermore, because of the nature of aluminum tubes, i.e., capped cylinders similar to toothpaste tubes, it is difficult to dispense all of the dye from a single tube, resulting in wasted product. Approximately 25% of the product in a typical dye tube may be wasted due to a user's inability to completely dispense the product, or through drying and discoloration caused by oxidation of the dye from leaving off the cap. Tube-based dyes are also high in viscosity which makes them difficult to manage.

Some attempts have been made to solve these problems. U.S. Pat. No. 7,407,055 to Rodriquez discloses a hair roots coloring kit, including a squeeze tube of hair dye and measuring devices such as syringes, a measuring cup and a pipette for establishing a dye quantity. In particular, a syringe may be inserted into a squeeze tube to retrieve hair dye. This invention contemplates conventional aluminum or similar hair dye squeeze tubes, and a dye comprising a viscous, high viscosity paste. For this reason, the dye must be pushed into a syringe by compressing the dye tube, rather than extracting dye with the syringe plunger. Furthermore there is no sealing arrangement between the tube and syringe, so that users must maintain them together under manual pressure to avoid leakage. Additionally, since there is no oxygen barrier between the syringe and the distribution end of the dye tube when uncapped, oxidation will occur.

U.S. Pat. No. 7,963,303 to Saranow, et al. discloses a hair dye apparatus and method having a computer screen for selecting a color from a color palette, and a dye quantity. The apparatus indicates the dyes a user will mix, and the user dispenses the dyes in a bowl atop a small electronic scale. While this apparatus keeps individual color containers separate and organized, it is bulky, complicated to use, and lacks the accuracy needed for professional applications. Also, it fails to solve the problem of wasted product.

U.S. Pat. Publication No. 2012/0048880 to Damolaris also discloses a dispensing apparatus for hair dye. In Damolaris, a user enters information relating to a desired color using a computer terminal, and the apparatus dispenses a predetermined amount of developer. While this apparatus presumably dispenses all of the dye in a container, it requires an expensive computer processor and substantial user training to operate. This invention fails to teach measurement or dispensing color. Rather, it's sole function is to measure developer.

For these reasons, commercial hair dye systems as known in the art are both wasteful and prone to error. Consequently, there is a need for a hair coloring system for commercial salons and professional stylists that allows users to accurately measure the pigments they use, and which also allows users to extract virtually all of a dye product from its packaging. Further, there is a need for a system that remains organized, allowing stylists to quickly and easily find colors to mix.

SUMMARY

An apparatus tor preparing an accurate and repeatable hair coloring includes a graduated measuring and dispensing vessel, together with a flexible container, preferably in the form of a laminated flexible packaging pouch, having a hair dye contained in an air-tight configuration in the container. The container includes an air-tight chamber, an opening, a self-sealing valve for receiving the graduated measuring and dispensing vessel in a substantially air-tight fashion, a closure for protecting contents within the container from being unintentionally discharged therefrom, and further includes a means for engaging the container with a container holder to support it. This may take the form of a rack in which the container sits, may include pegs from which the container hangs or provide a similar arrangement in which the container is suspended for easy access by a hair color professional.

The container of the present invention is preferably in the form of a flexible packaging pouch which, in addition to its being air-tight, is constructed in such a way that the product contained in the container does not chemically react in any way with the air-tight inner chamber of the container. Typically, the flexible packaging pouch will be constructed of multiple layers of material, i.e. a laminate material. An example of a suitable laminate material includes one having an inner layer, an outer layer and an intermediate layer. The intermediate layer may be metallic in nature such as, for example, aluminum foil. The inner layer that is in direct contact with the product may be made of polyethylene, although any flexible material that is inert to the product may be employed. The outer layer may be made of any material that lends itself to printing thereon, and provides protection to the intermediate layer from physical abuse. One example of a laminate flexible packaging pouch that may be used in accordance with the present invention is found in US 20120205267, the entire content of which is hereby incorporated by reference. It should be noted, however, that the flexible packaging pouch may be constructed of any single material, or layers of material that render it sturdy, airtight and inert to the product contained therein.

The apparatus of the present invention also includes a self-sealing valve provided with a closure cap located at the opening/spout of the pouch, such that when the measuring and dispensing vessel engages the self-sealing valve, the hair dye may be extracted from the air-tight chamber, and when the measuring and dispensing vessel is disengaged from the container, the self-sealing valve closes of the air-tight chamber. In this manner, a user may withdraw a known quantity of the hair dye from the container into the measuring and dispensing vessel, combine it with known quantities of other color hair dyes, thereby allowing an accurate quantity of total hair dye to be dispensed from the container enabling the hair professional to mix an accurate and repeatable hair dye color.

The self-sealing valve is preferably made from an inert substrate. Examples thereof include rubber and rubber-like materials such as, for example, silicone. The valve provides a self-sealing dispensing orifice through which the contents of the container may be dispensed, while providing a resilient sealing means when dispensing is not desired. The self-sealing valve preferably also comes with a cap member to further protect the contents inside the container.

According to an embodiment of the present invention, there is also provided a quick-acting coupling mechanism comprised of two parts, a plug representing the male half of the coupling mechanism and a socket representing the female half. In this embodiment, either the valve or the vessel can serve as the male or female half. In a particularly preferred embodiment, the self-sealing valve with closure cap is configured in such a way that it serves as the female socket half of the coupling mechanism and the vessel is configured in such a way that it serves as the male plug half. When coupled properly, the valve and vessel are both sealed and locked together. Examples of suitable coupling mechanisms include, but are not limited to bayonet couplings that rely on a twist locking arrangement, or those coupling mechanisms where the plug (vessel) has a lip/flange on the end being inserted into the valve which is sufficiently larger in diameter than the opening of the socket (valve) into which the plug is being inserted such that when the vessel is pushed into the valve, a seal is formed and the two components are removably locked in place. The precise type of coupling mechanism employed is not critical, so long as the valve and vessel are sealed and locked together when coupled.

The self-sealing valve, together with the quick-acting coupling mechanism, serves two important functions. First, they enable the vessel to be quickly and easily coupled and de-coupled from the container in a secure manner. Secondly, they further inhibit the introduction of ambient air into the container associated with the extraction step to further limit undesirable degradation of the product due to oxidation.

In one embodiment, the container includes an engaging device at the opening for releasably connecting the measuring and dispensing vessel to the container in an air-tight manner to prevent the measuring and dispensing vessel from inadvertently disengaging from the container. Additionally, the container may include an outer layer made of a semi-rigid poly-plastic material, such that in one embodiment the container is essentially a collapsible bag while in another, it retains a uniform outer shape while an interior collapsible bag deforms. Preferably, the opening is at the bottom of the container relative to a container label.

In addition to an engaging device for retaining the container and the measuring and dispensing vessel in a locking configuration, in an alternative embodiment, to prevent hair dye from exiting the container when the measuring and dispensing vessel disengages the container, an air-tight reclosing seal, for instance a self-sealing orifice reducer may be used instead of or along with the engaging device for added security.

The container holder of the apparatus may take the form of a rack capable of holding multiple containers including a complete color line from a hair dye manufacturer. The multiple containers may hang suspended from the rack. In this manner the rack may hold multiple containers of the same color in a row, such that a full container can be brought forward when an empty container is removed from the rack. The rack may also be a holder in which multiple containers are seated. In this arrangement access to the bottom of the containers is provided by slots or holes in the rack.

Preferably the measuring and dispensing vessel comprises a graduated reusable device capable of accurately dispensing a known quantity of hair dye. In a preferred embodiment a syringe or syringe-type vessel is used. The vessel is configured such that its extraction/dispensing end is capable of both effectively penetrating through the self-scaling dispensing orifice of the valve into the air-tight chamber of the container, as well as easily withdrawing product from inside the container. The extraction/dispensing end should be of an appropriate diameter to facilitate the efficient extraction of products of varying viscosities. The extraction/dispensing end may be in the form of a tip that may be integrally connected to the vessel. The tip, however, may also be removably/interchangeably connected to the vessel and may come in various configurations and diameters.

To assist in securely connecting the syringe with the opening of a container, the opening and the syringe may be equipped with a luer-lock arrangement and the opening include a shut-off valve similar to an IV bag. In another embodiment an orifice reducer alone may be used.

Regardless of the locking arrangement of the syringe and opening, the syringe preferably includes an oxygen-free barrier to prevent oxidation or similar degradation of the hair dye and its color. One contemplated method of presenting an oxygen free barrier that resists the corrosive qualities of ammonia-based hair dye is a fluorination barrier treatment with which the surfaces of a syringe or similar vessel may be treated.

Once the syringe has extracted a desired quantity of hair color from one container, a user may engage the syringe with a second container bearing a second color. Once each quantity of hair dye is extracted from a container, the dyes may be mixed to obtain a predetermined color in a mixing bowl. Preferably the mixing bowl is made from a material that will not affect or take on the hues of the hair dye.

In the event the same syringe is used to extract different colors from different containers, the syringe will need to be washed in between extractions. This additional washing step can be avoided, however, by assigning a single syringe to each specific color. The syringe, when not in use, can remain coupled to the self-sealing valve of the container. Thus, by assigning a specific syringe to a specific color, an intermediate washing step can be avoided, thus further enhancing the efficiency of the system.

In an alternative embodiment, an apparatus for preparing hair dyes includes a graduated measuring and dispensing vessel, such as a syringe as described above, which is filled, i.e., pre-filled, with a predetermined amount of hair dye. Preferably a re-sealable cap is provided for covering an opening of the graduated measuring and dispensing vessel in an air-tight configuration to prevent oxidation and leakage of the hair dye prior to and after use.

A rack for storing multiple graduated measuring and dispensing vessels in an organized arrangement according to color is preferably provided in this embodiment, and allows them to be stored in rows of the same color to prevent running out of a particular hair dye. In this embodiment, the graduated measuring and dispensing vessel also includes an oxygen-free barrier.

Since the oxygen free barrier is opaque, a label may be included on the exterior of the graduated measuring and dispensing vessel corresponding to hair dye's color. Like prior embodiments, the surfaces of the measuring and dispensing vessel may be treated with a fluorination barrier treatment or similar preservative for oxygen-free storage. Furthermore, since the graduated measuring and dispensing vessel in this embodiment is essentially the container for a hair dye, it may include a handle for engaging the rack.

In order to use the hair coloring apparatus to mix an accurate color, a first container is provided having a quantity of hair dye contained in it. A first opening is provided in the first container, the opening presenting an air-tight re-closable seal on the first container. A graduated measuring and dispensing vessel, such as a syringe, capable of holding a predetermined quantity of hair dye is then provided, and is used to access the first opening with the graduated measuring and dispensing vessel, withdrawing a first predetermined quantity of hair dye from the first container and dispensing it in a mixing bowl.

A second container is then provided having a quantity of hair dye contained therein. Like the first container, the second container has a second opening with an air-tight re-closable seal on the second container. The second container is accessed with the graduated measuring and dispensing vessel and a second predetermined quantity of hair dye withdrawn from the second container. The second predetermined quantity of hair dye is then dispensed into the mixing bowl and mixed with the first predetermined quantity of hair dye. A developer, preferably peroxide based, may then be added to the dye, followed by application onto a consumer's hair.

Preferably, an oxygen barrier may be provided on the graduated measuring and dispensing vessel (e.g. syringe) to prevent degradation of the hair dye, particularly in an embodiment where the container takes the form of a syringe, obviating the need for connecting a syringe to a separate container of hair dye. Additionally a rack may be provided for the first container and the second container, or in an alternate embodiment hair dye-containing syringes to keep the colors organized. In a preferred embodiment, additional containers having quantities of different hair dye colors may be loaded in and dispensed from the rack.

The apparatus of the present invention can also be adapted for use by retail consumers who prefer to color their own hair rather than having it done professionally. According to this embodiment, the system comprises at least two flexible packaging pouch containers, one with a hair dye product and one with developer. Each pouch has a self-sealing valve with cap closure located at a dispensing end of the pouch, at least one extraction/dispensing graduated vessel, a quick-release locking mechanism having a female socket portion at the valve opening and a male plug portion at the vessel opening, at least one mixing bowl, instructions as to specific quantities of dye and/or developer to be mixed together and, optionally, a root touch-up tool capable of directing hair dye directly onto a consumer's hair roots.

In operation, a consumer wanting to apply a specific color onto their hair would withdraw a specific amount of hair dye from one pouch using the vessel, dispense the dye into the mixing bowl, add developer from a second pouch thus forming a ready-to-apply hair color, and apply it onto their hair.

In the event a consumer desires a custom, in-home hair color treatment for their hair, such as they might obtain at a professional hair salon, multiple flexible packaging pouch containers, each containing a different color hair dye, can be provided. Instructions for mixing predetermined amounts of each hair dye product are provided, whereby the consumer will extract the predetermined amount of each hair dye color from their respective containers, mix the colors together in a mixing bowl, add a predetermined amount of developer, and apply the mixture onto their hair.

It should be noted that the apparatus of the present invention may also be used to dispense and/or mix any ingredients that are susceptible to degradation when exposed to ambient air and/or UV light. Thus, according to yet another embodiment of the present invention, there is provided a system for applying a skin treatment composition onto a consumer's skin. In this embodiment, the product contained in the containers is a formulation that is sensitive to degradation, such as oxidation, when exposed to ambient air. For example, formulations containing potent antioxidants such as vitamin C, resveratrol, retinol, ferulic acid, and the like can be extracted from their respective flexible pouches and mixed together, in situ, in a mixing bowl, just prior to application onto the skin. Because the formulations are protected from unwanted oxidation in the pouches both pre- and post-extraction therefrom, the likelihood of their degrading prior to complete exhaustion of the product from the pouch is greatly diminished. Therefore, a consumer at home and/or professional working, in a dermatologist office and/or spa can have a measure of confidence that the formulations contained in the flexible pouches will retain a level of efficacy after numerous uses.

In one alternative embodiment, the present invention may be characterized as a kit having a graduated measuring and dispensing vessel, at least one flexible packaging pouch container having a hair dye product contained therein, the container comprising an air-tight chamber and an opening, at least one flexible packaging pouch container having a developer contained therein, the container comprising an air-tight chamber and an opening. A self-sealing valve is provided with a closure cap and dispensing orifice located at the opening of the pouch and capable of receiving the measuring and dispensing vessel, such that when the measuring and dispensing vessel engages with the self-sealing valve, the hair dye products may be extracted from the air-tight chamber via the dispensing orifice, and when the measuring and dispensing vessel is disengaged from the self-sealing valve, the dispensing orifice closes, thereby sealing the air-tight chamber.

A quick-acting coupling mechanism is configured such that the self-sealing valve serves as the female socket end, and the graduated measuring and dispensing vessel serves as the male plug end. At least one mixing bowl is included into which the hair dye product and developer are dispensed and at least one mixing tool is included, for mixing the hair dye product and developer in the mixing bowl, thereby permitting a known quantity of the hair dye product and/or developer to be withdrawn from their respective containers into the measuring and dispensing vessel, allowing an accurate and repeatable quantity of hair dye and/or developer to be dispensed from their respective containers. Preferably, the kit may have at least one additional flexible packaging pouch container having a different color hair dye product contained therein, such that the two hair dye products, when mixed together and with the developer, form a custom hair color product.

In another embodiment, the invention is an apparatus for preparing an anti-aging treatment composition. In such an embodiment, the apparatus includes a graduated measuring and dispensing vessel, flexible packaging pouch container made from an inert substrate that is impervious to UV light and/or ambient air, having at least one anti-aging active compound sensitive to ambient air and/or UV light contained therein, the container comprising an air-tight chamber and an opening, self-sealing valve provide with a closure cap and dispensing orifice, located at the opening of the container and capable of receiving the measuring and dispensing vessel, such that when the measuring and dispensing vessel engages with the self-sealing valve, the anti-aging active compound may be extracted from the air-tight chamber via the dispensing orifice, and when the measuring and dispensing vessel is disengaged from the self-sealing valve, the dispensing orifice closes, thereby sealing the air-tight chamber, and a quick-acting coupling mechanism configured such that the self-sealing valve serves as the female socket end, and the graduated measuring and dispensing vessel serves as the male plug end.

This embodiment permits a known quantity of the compound to be withdrawn from the container into the measuring and dispensing vessel, allowing an accurate and repeatable quantity of anti-aging compound to be dispensed from the container. The graduated measuring and dispensing vessel is preferably shaped as a syringe provided with an extraction/dispensing end with an opening having a predetermined diameter that is capable of both effectively penetrating through the self-sealing dispensing orifice of the self-sealing valve into the air-tight chamber of the container, and efficiently withdrawing product from inside the container. The extraction/dispensing end may be shaped like a tip and integrally connected to the vessel.

In one alternative of the embodiment, the tip may be removably/interchangeably connected to the vessel and comes in various configurations and diameters. The flexible packaging pouch container may be made from a laminate material, the self-sealing valve with closure cap may be made from an inert substrate, and the inert substrate may be chosen from rubber or a rubber-like substance such as silicone. Additionally, the quick-acting coupling mechanism may be chosen from a bayonet coupling, that relies on a twist locking arrangement, or a force actuated coupling mechanism comprised of a lip/flange on the plug end of the vessel that is inserted into the female socket end of the valve, such that when the vessel is pushed into the valve, a seal is formed and the vessel and valve are removably locked in place. The anti-aging compound may be an antioxidant, and chosen from vitamin C, resveratrol, retinol, ferulic acid and mixtures thereof.

In an alternative anti-aging embodiment, the invention may be characterized as a kit having a graduated measuring and dispensing vessel, at least one flexible packaging pouch container made from an inert substrate that is impervious to UV light and ambient air having at least one anti-aging active compound sensitive to ambient air and/or UV light contained therein, the container comprising an air-tight chamber and an opening, a self-sealing valve provided with a closure cap and dispensing orifice, located at the opening of the pouch and capable of receiving the measuring and dispensing vessel, such that when the measuring and dispensing vessel engages with the self-sealing valve, the anti-aging compound may be extracted from the air-tight chamber via the dispensing orifice, and when the measuring and dispensing vessel is disengaged from the self-sealing valve, the dispensing orifice closes, thereby sealing the air-tight chamber.

A quick-acting coupling mechanism is configured such that the self-sealing valve serves as the female socket end, and the graduated measuring and dispensing vessel serves as the male plug end, and optionally, at least one bowl into which the anti-aging compound may be dispensed to permit a known quantity of the anti-aging compound to be withdrawn from the container into the measuring and dispensing vessel, allowing an accurate and repeatable quantity of anti-aging compound to be dispensed from the container. The kit preferably includes at least one additional flexible packaging pouch container having a different anti-aging active compound contained therein, such that the two anti-aging compounds, when mixed together, form a custom anti-aging treatment product.

| REFERENCE NUMBERS | |
|---|---|
| 10. | Individual Dye Containers |
| 11. | Labels |
| 12. | Rack |
| 14. | Syringe |
| 15. | Calibrated Scale |
| 16. | First Locking Adapter |
| 17. | Inner Layer |
| 18. | Neck |
| 19. | Outer Layer |
| 20. | Second Locking Adapter |
| 22. | Air-Tight Seal |
| 23. | Locking Connector |
| 24. | Oxygen Free Barrier |
| 26. | Syringe Barrel |
| 28. | Syringe Graduations |
| 30. | Plunger |
| 32. | Marker |
| 34. | Handle |
| 36. | Syringe Rack |
| 38. | Indicia |
| 40. | Cap |
| 42. | Orifice Reducer |
| 100. | Alternative Container |
| 102. | Chamber |
| 104. | Hair Color Product |
| 106. | Seal |
| 108. | Fitment Hole |
| 110. | Valve |
| 112. | Flip-Top Cap |
| 114. | Sloped Portion |
| 116. | Top |
| 118. | Bottom |
| 120. | Hangar Hole |
| 122. | Rack |
| 124. | Clip |
| 126. | Hook |
| 128. | Twist lock |
| 130. | Self-Sealing Cap |
| 132. | Valve Closure |

DESCRIPTION

Figure 1:
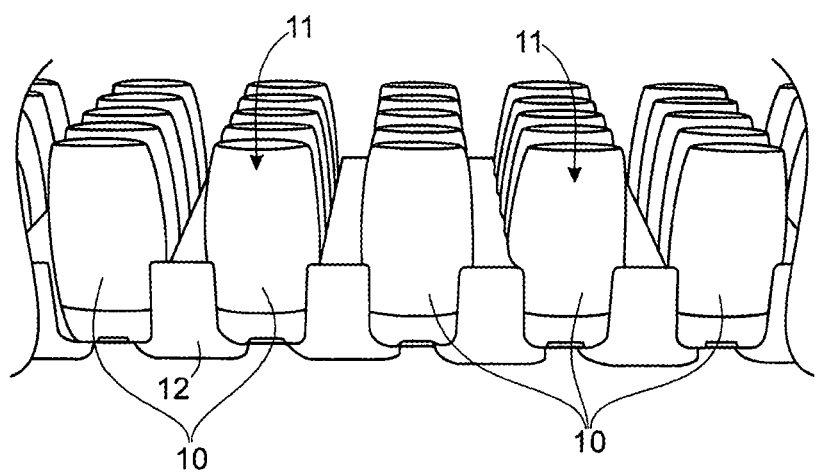
FIG. 1 is a perspective view of a series of hair dye containers disposed in a rack.

Referring to FIG. 1, the system comprises a series of individual dye containers 10. Like the aluminum hair dye tubes currently known in the art, each container preferably holds a different pigment, including base colors, highlighting tones, and developer (also known as "fixing solution"). Unlike tubes known in the art, the containers 10 are collapsible, and may comprise single-layer flex-packaging (e.g. IV bag type pouch (see FIG. 10)), or the containers 10 may be multi-layered, comprising a flexible and collapsible air-tight inner layer 17 containing a liquid dye, and an outer layer 19 made of a semi-rigid poly-plastic material (see FIG. 4).

In one embodiment the laminated material forming as flexible container for holding hair dye or similar materials is contemplated. The laminated material may include a first, internal surface, and a second, external surface. Optionally, an intermediate foil barrier layer (not shown) may be included, separating the first and second surfaces.

The containers 10 are adapted to dispense their contents from the bottom relative to their labels 11, and are designed to removably install into a rack 12, which is adapted to hold multiple containers 10. Preferably, the rack 12 comprises a polymer-type horizontal and expandable storage adapted to hold numerous containers 10.

Figure 2:
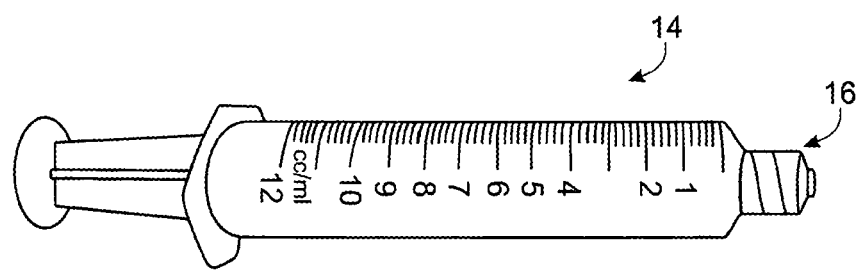
FIG. 2 is a side view of a graduated piston syringe with a locking adapter at the tip.

Referring to FIG. 2, A graduated piston syringe 14, having a calibrated scale 15 on the barrel for reading volume, and preferably clear to see the color of its contents, is used in connection with the containers 10. The syringe 14 preferably comprises a first locking adapter 16 such as a luer-lock at the tip, and is sized appropriately for normal volumes of hair dye. The first locking adapter 16 is designed to lockably engage a neck 18 (see FIG. 4) on a container 10. In the illustrated embodiment, the male portion of a luer-lock is shown at the tip of the syringe 14.

Figure 3:
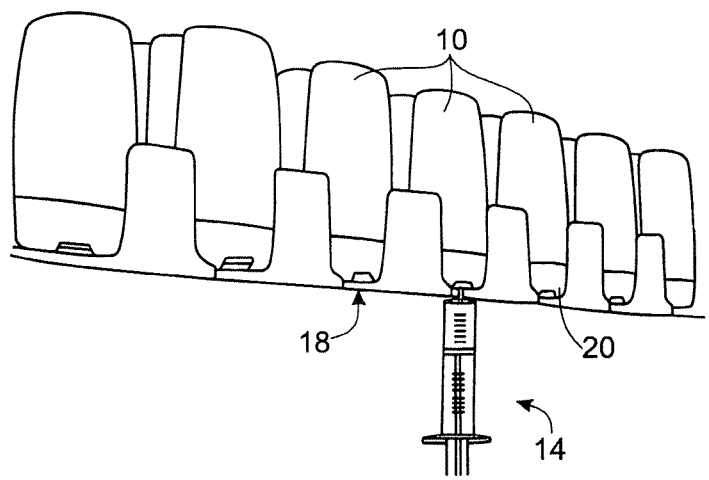
FIG. 3 is a perspective view of a syringe preparing to connect and withdraw hair dye from a container.
Figure 14:
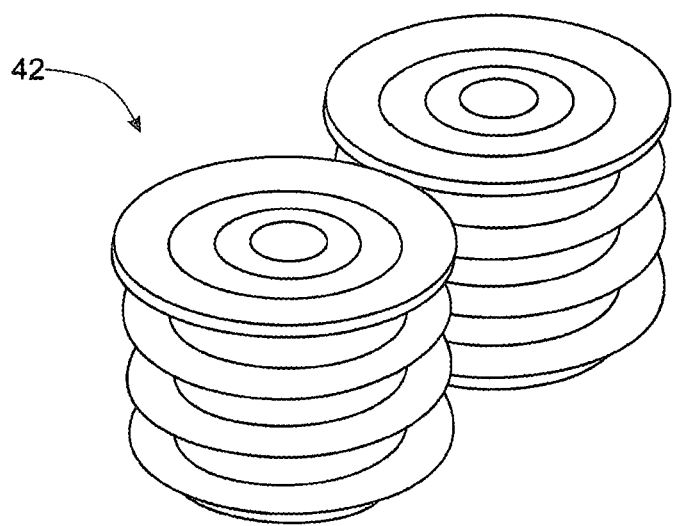
FIG. 14 shows an orifice reducer to be incorporated into the neck of a hair dye container.

Referring to FIG. 3, each container 10 neck 18 is equipped with to second locking adapter 20, complimentary to the first locking adapter 16, for example, the complimentary component of a luer-lock. Preferably, the neck 18 of each container 10 will also incorporate an air-tight seal 22, such as a ring-stopper (see FIG. 14) to prevent leakage and oxidation of a container's 10 contents when the syringe 14 is removed. In this manner a syringe 14 can make a leak-proof connection to any container 10.

Figure 4:
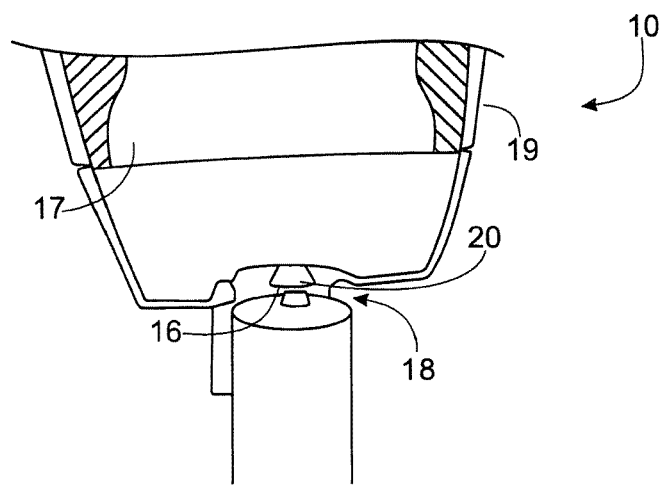
FIG. 4 is a perspective view of a syringe connected to a hair dye container.
Figure 5:
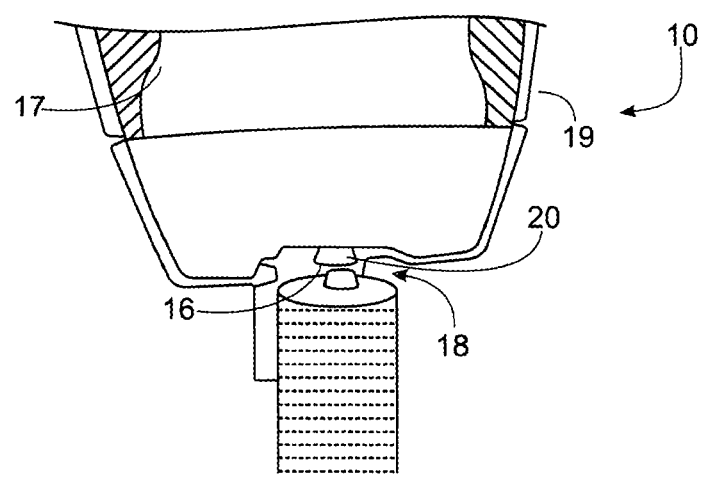
FIG. 5 is a perspective view of a syringe extracting dye from a hair dye container.

Referring to FIG. 4, in order to use the system, a user selects as color from among the containers 10 disposed in the rack 12. With the desired color selected, the piston syringe 14 is brought to the neck 18 of a container such that the first locking adapter 16 engages the second locking adapter 20, and the air-tight seal 22 is broken, allowing dye to enter the syringe 14 under negative pressure as shown in FIG. 5. Preferably, when the first locking adapter 16 and second locking adapter 20 are connected, they form an air-tight seal. Users may locate and dispense a known quantity of a known dye quickly when preparing a hair coloring mixture due to the organization of the containers in the rack 12 (not shown).

Figure 6:
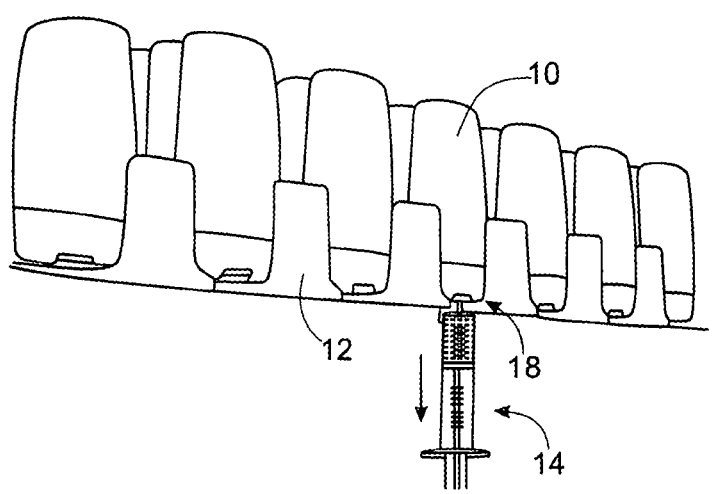
FIG. 6 is a perspective view of a syringe disconnecting from a hair dye container without leakage.

Referring to FIG. 6, after a desired quantity of a given dye has been transferred to a syringe 14, the syringe may be disengaged with the container 10. In the case of a luer-lock adapter 16, 20, the user would simply turn the syringe 14 relative to the container 10 while the container 10 is held in the rack 12 and prevented from turning by a pressure fit or obstruction fit between the rack 12 and the neck 18 of the container 10. Importantly, once the syringe 14 disengages the second locking adapter 20 and seal 22, the seal 22 closes, recreating an air-tight seal, and preventing the contents of the container 10 from leaking. In this manner, no dye is wasted during dispensing. Also, a low viscosity dye may be easily used without spillage.

Figure 7:
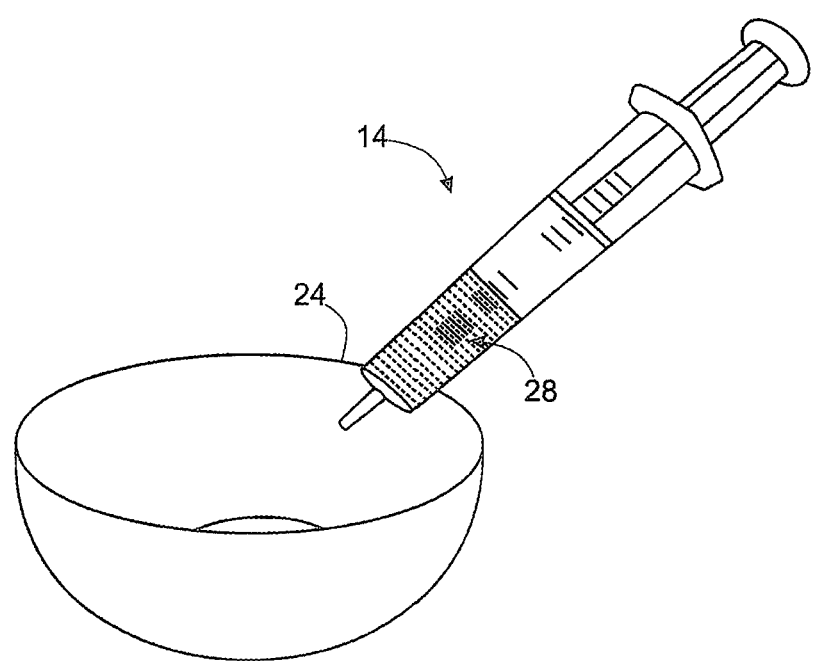
FIG. 7 is a perspective view of a syringe dispensing hair dye in to a mixing container.

Referring to FIG. 7, once a user obtains a syringe 14 with the desired quantity of dye, the dye may be dispensed into a mixing receptacle 24 where it will be combined with other pigments, and developer as desired to achieve a specific, easily and accurately duplicated hair color. After the syringe 14 dispenses the dyes, it may be easily cleaned under running water before being re-used with other dyes or developers for other salon customers.

Figure 8:
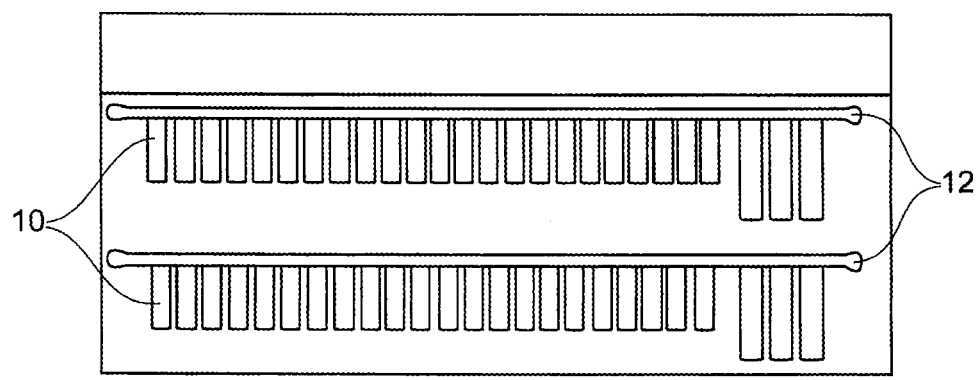
FIG. 8 is a side view of a series of bag-type hair dye containers disposed in a horizontal hanging rack.
Figure 9:
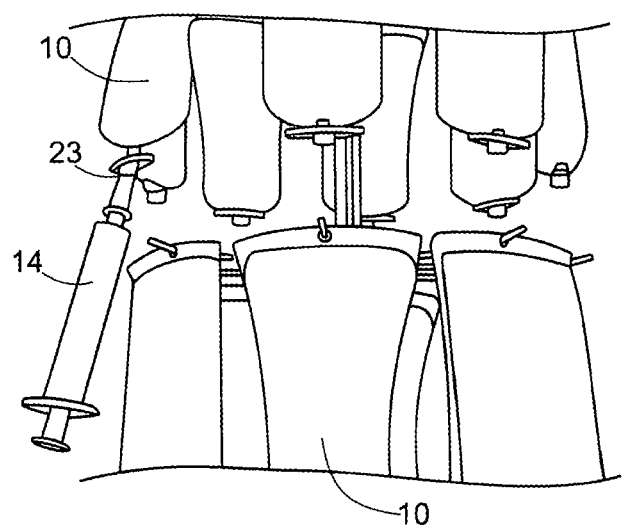
FIG. 9 is a close-up perspective view of a syringe extracting hair dye from a bag-type container having re-sealable closure
Figure 10:
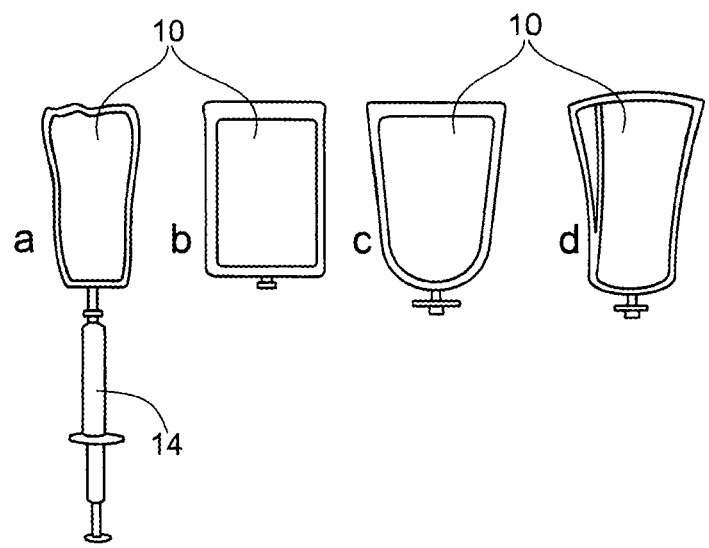
FIG. 10 is a plan view of a variety of bag-type hair dye containers and a connecting syringe.

Referring to FIGS. 8-10, embodiments of the invention comprising the aforementioned "IV Bag" type of container 10 are shown. FIG. 8 shows a series of color containers 10 assembled in a rack designed to suspend individual containers in an organized and easy to access manner. The system may comprise horizontal and expandable storage racks 12 that holed the containers 10 such that an entire professional hair color product line and developer is contained in a rack 12. The containers 10 securely hung from the storage racks 12 may be mounted on a wall in a salon in a highly organized and accessible manner. In FIG. 9, the containers are shown on an alternative carousel type rack. In this view re-sealable locking connectors 23 at the base of a bag-type color container 10 is shown connected to a syringe 14. The container may also include a shut-off valve 24 for stopping the flow of hair dye once the syringe is removed. FIG. 10 shows a variety of bag-type dye container with an adjacent syringe prepared for extracting dye from the container.

Figure 11:
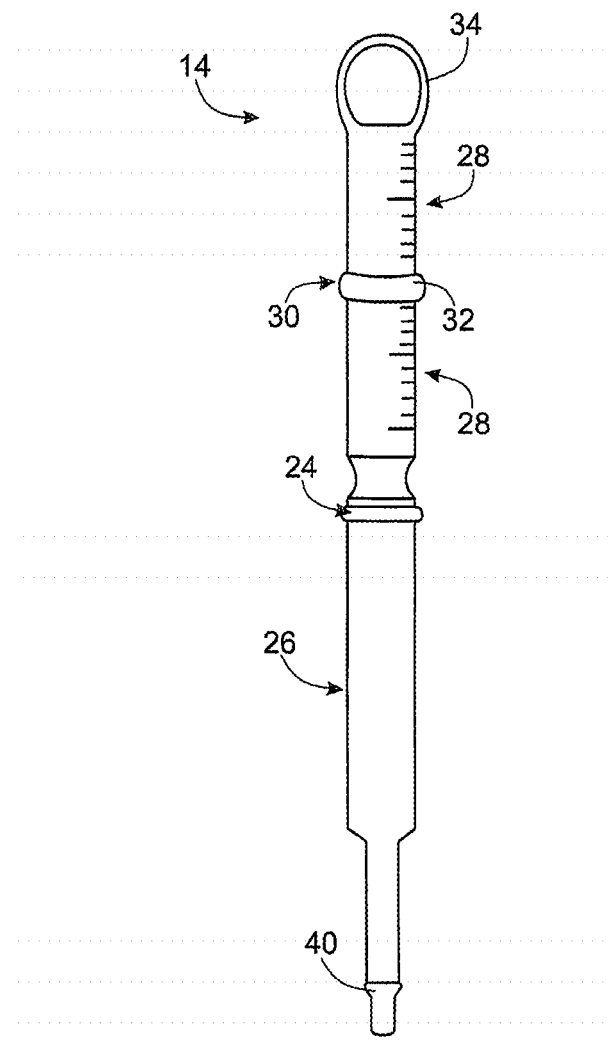
FIG. 11 is a side view of individual dye-containing syringes.

Referring to FIG. 11, in an alternative embodiment, a single barrel syringe 14 may be manufactured with a predetermined quantity of dye pre-installed in the syringe 14. Each syringe in this embodiment may have a unique color or shade inside, while a multi-layered oxygen-free barrier 24 lines the inside of the syringe barrel 26. Due to the opacity of the oxygen-free barrier 24, the color of the dye contained in the syringe 14 may be applied or labeled on the barrel 26 exterior, in order to ensure accurate dispensing, the syringe graduations 28 are preferably located on the plunger 30 designed to align with a marker 32. In one embodiment, a screw-cap (not shown) may be installed at the end of the barrier, to provide a measurement guide. A handle 34 may be installed on the plunger 30 for incorporating multiple single syringes 14 into a rack system (not shown) bearing a variety of colors.

In this manner, syringes 14 with commonly used colors may be purchased separately from other, less used colors. A plurality of these syringes 14 may be used to store the entire color line of a manufacturer. In one embodiment a single pre-loaded syringe may be a common 150 ml syringe, in other embodiments larger or smaller syringes may be employed as desired, including using a larger, 250 ml or greater syringe for commonly used colors to avoid syringe replacement.

Figure 12:
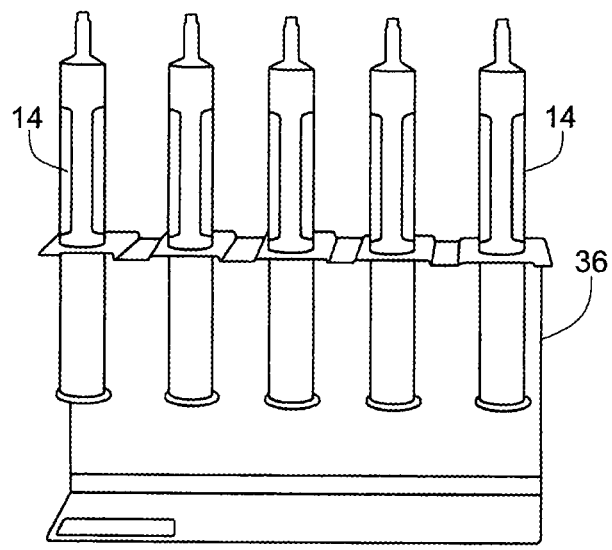
FIG. 12 is a side view of dye-containing syringes in a rack.

Referring to FIG. 12, the single pre-loaded syringes 14 may be stored in vertical rows on a horizontal rack 36 and removed by a stylist to dispense a desired quantity of pigment into a mixing bowl. Other syringes 14 of the same color may be stored behind the syringe-in-use. In an embodiment where individual syringes are removed and re-installed on a rack, each syringe plunger and/or barrel may also include indicia 38 matching indicia on the rack to ensure proper replacement of a syringe 14 after use. A cap 40 is preferably provided for each individual syringe 14 to prevent contamination by other colors.

Figure 13:
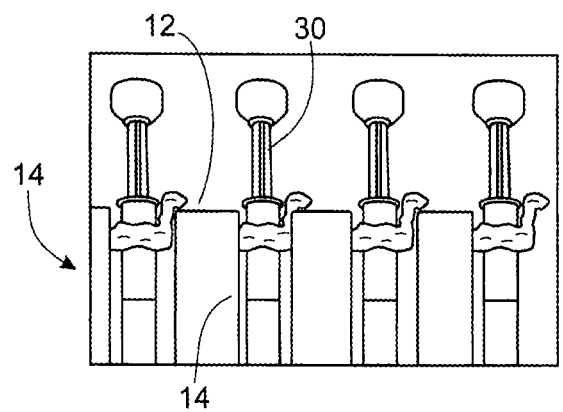
FIG. 13 is a side view of an alternate embodiment of dye-containing syringes in a rack.

Referring to FIG. 13, an alternative embodiment may include a syringe 14 securely suspended from a rack 12. In this embodiment, a front syringe in use is shown however other syringes of the same color may be stored on the rack behind the secured front syringe for replacing it when empty. In this embodiment, a stylist may hold a mixing bowl (not shown) under the securely mounted syringe 14 and depresses the plunger 30 to dispense color into the bowl. It is anticipated the viscosity typical of hair dyes is such that without pressure on the plunger 30, even when inverted with the hub of the syringe 14 pointing downward, dye will not leak from the syringe 14. Notwithstanding this property of the dye, a cap (not shown) may be proved for the tip of each syringe 14 to prevent cross-contamination and oxidation from occurring.

In this manner a complete hair color line may be pre-packaged into a plurality of single-barreled, disposable plastic dose syringes 14. The syringes 14 are preferably manufactured and packaged with predetermined quantities of hair color pre-loaded into the syringe 14. Each syringe 14 has a unique color or shade inside each barrel 26. A handle 34 or similar structure such as a hanger hole may be located at the to of the plunger 30 for holding multiple syringes in a vertical rack system storing, a variety of colors in a color line. To ensure accurate dispensing, the syringes 14 may be milliliter graduations located on the plunger 30 designed to alight with a marker 32 (such as an MDR ring) at the barrel 26 to provide a measurement guide and plunger 26 actuator.

The system is entirely oxygen-free so that the colorant and developer is protected from being contaminated by oxygen, as oftentimes occurs with the conventional formulation methodology. To prevent oxidation and/or corrosion from occurring from highly corrosive ammonia-based hair dye, a multi-layered barrier may line the inside and in some embodiments including the exterior of the plastic syringe barrel 26. An alternative feature to prevent oxidation and corrosion may include a fluorination barrier treatment, whereby fluorine atoms bonded to inner and outer surfaces of the syringe create a double-sided barrier.

Due to the opacity of the oxygen-free barrier, the color of the dye contained in the syringe 14 may be applied or labeled on the barrel 26 exterior. A screw-cap may also be incorporated into the end of the barrier to prevent dripping and also serve as an oxygen barrier.

As discussed, a plurality of the syringes may be used to store the entire color line of a manufacturer in a horizontal storage rack, and syringes containing commonly used colors may be purchased separately from other, with less used colors purchased more infrequently. A single pre-loaded syringe may be a common 150 ml syringe, in other embodiments larger or smaller syringes may be employed as desired, including using a larger, 250 ml or greater syringe for commonly used colors to avoid syringe replacement.

In the embodiment with separate containers 10, a manually operated, a clear, metrically calibrated reusable, needle-less 60 mL luer-lock syringe may be used. An assembly of multiple, multi-layer flex-packing containers 10 are each filled with a unique shade of hair color and developer. The color is withdrawn by the syringe to the exact millimeter from various containers 10 according to a predetermined formula and dispensed into a mixing bowl for combination.

Two unique container designs are contemplated, one for color and one for developer. A first container may contain 6 ft ounces (i.e., 180 mL) of color. Incorporated into a spout at the bottom of the container 10 may be an airtight seal consisting of a permanently installed female to male in-line luer-lock connector with a shut off valve to prevent dripping and leakage. An oxygen barrier and highly secure connection between the pouch and syringe allows the system to be entirely oxygen-free so that the color and developer is protected from being contaminated by oxygen, as oftentimes occurs with the conventional formulation methodology.

A second container design includes a self-sealing orifice reducer 42 (see FIG. 14) that creates an airtight seal. A catheter syringe is inserted into the orifice reducer 42 to withdraw the required amount of color according to a formula. Upon withdrawal of the syringe, the opening in the orifice reducer closes firmly, preventing leakage and protecting the color from oxidation. Another container design (not shown) may be included for developer and hold approximately 33 oz.

Figure 15:
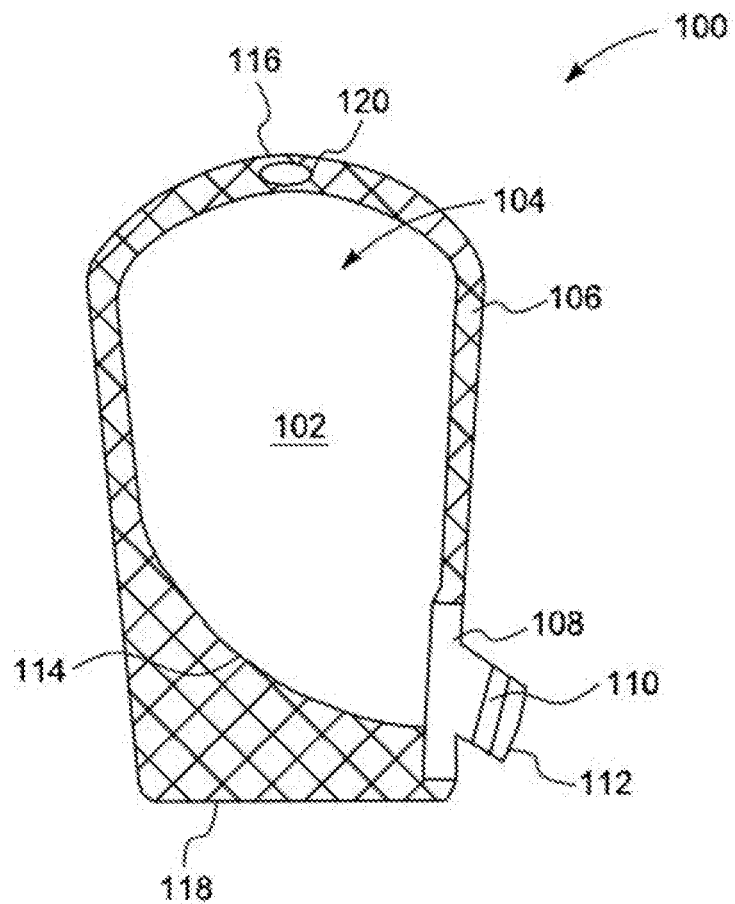
FIG. 15 shows a cut-away view of an alternative bag-type container according to one preferred embodiment.

Referring to FIG. 15, an alternative embodiment dye container 100 is shown. The container includes a chamber 102 for containing a hair color product 104. The chamber 102 is surrounded by a seal 106 that prevents exposure of the hair color product 104 to the air. A fitment bole 108 is included at a junction of the seal 106 to a valve 110 through which the hair color product 104 can be extracted. In one preferred embodiment, the fitment hole is 28 millimeters in diameter. In another preferred embodiment, the valve 110 includes a flip-top cap 112, and may be sized for a 28-400 sized valve neck. The seal 106 includes a sloped portion 114 to encourage all hair color product 104 in the container 100 to reside near the valve 110 for extraction as the container 100 empties. In one embodiment, the container 100, when empty, may be eight inches tall, six inches across at the top 116, and four inches across at the bottom 118. A hangar hole 120 is preferably included adjacent the top 116 for hanging the container 100. When full, the container 100 may hold six fluid ounces of the hair color product 104

Figure 16:
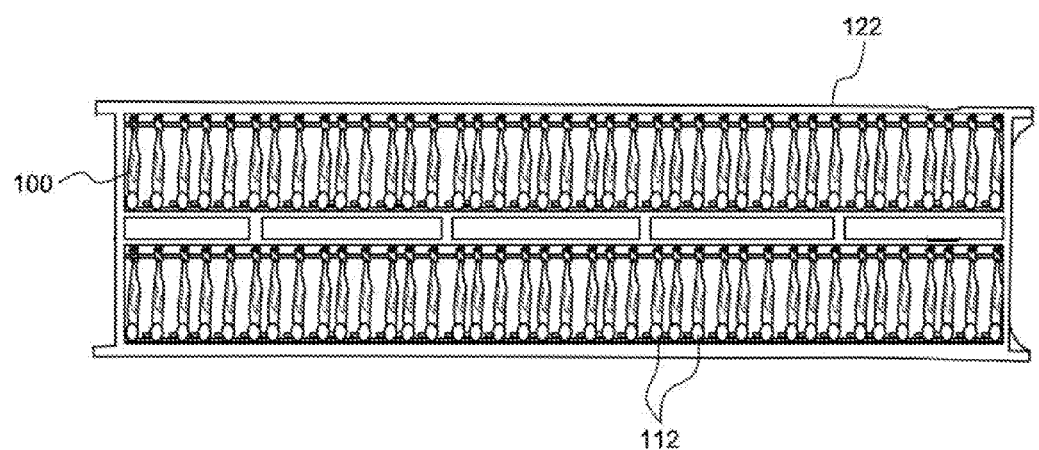
FIG. 16 shows a rack holding a series of bag-type containers representing an entire color line of the coloring system.
Figure 17:
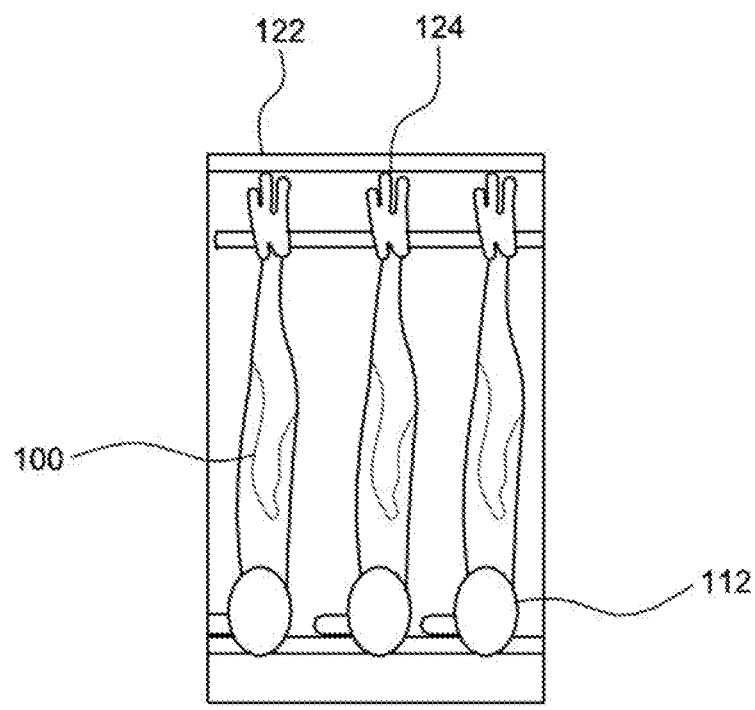
FIG. 17 is a close-up view of a portion of the rack holding containers by clips.
Figure 18:
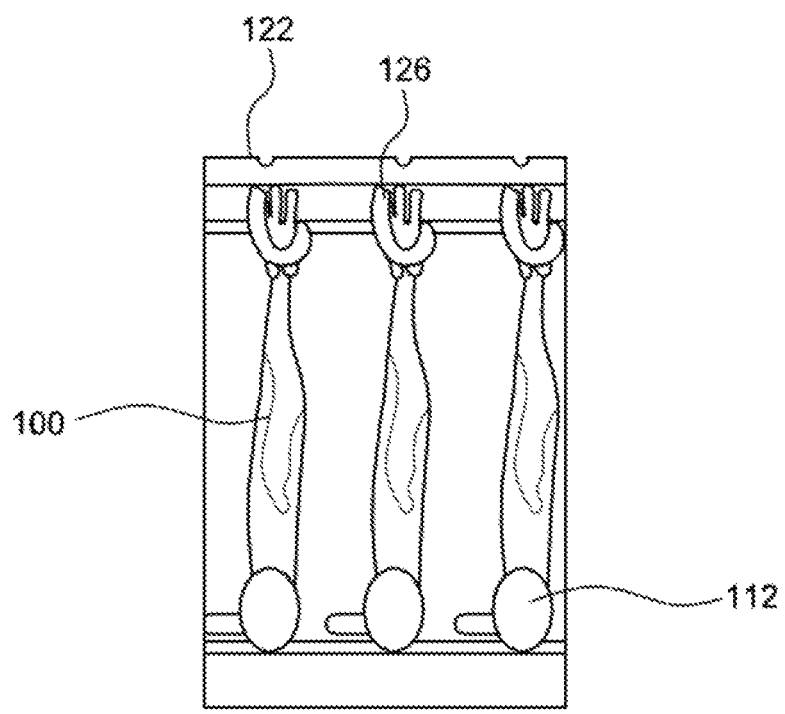
FIG. 18 is a close-up view of a portion of the rack holding containers by hooks.

Referring to FIGS. 16-18, a series of containers 100 are shown in a rack 122. Preferably the rack 122 is sized to hold the customary number of colors (i.e., containers 100) used for a single hair color product line. As shown, the containers 100 are suspended in the rack 122 and oriented so that the caps 112 to the valves 110 are accessible to a user. As shown in FIGS. 17 and 18, respectively, the containers 100 may be suspended from clips 124 or may be suspended from hooks 126 in the rack 122.

Figure 19:
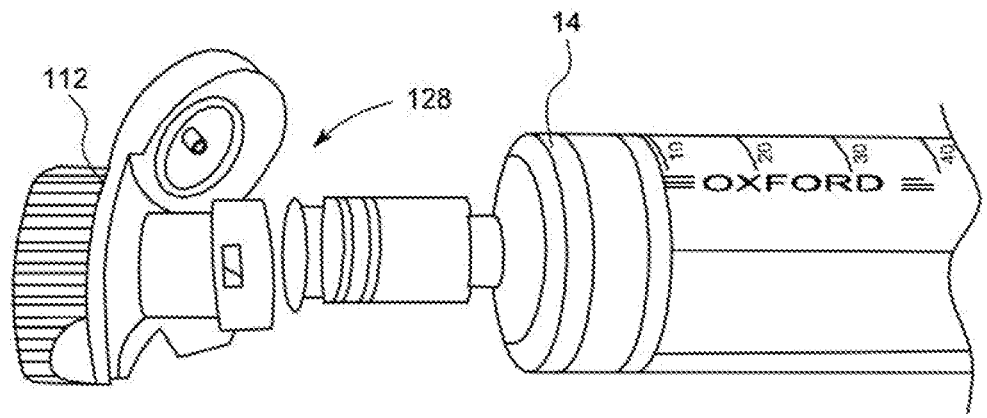
FIG. 19 shows an alternative closure for the container and a syringe having a twist lock.
Figure 20:
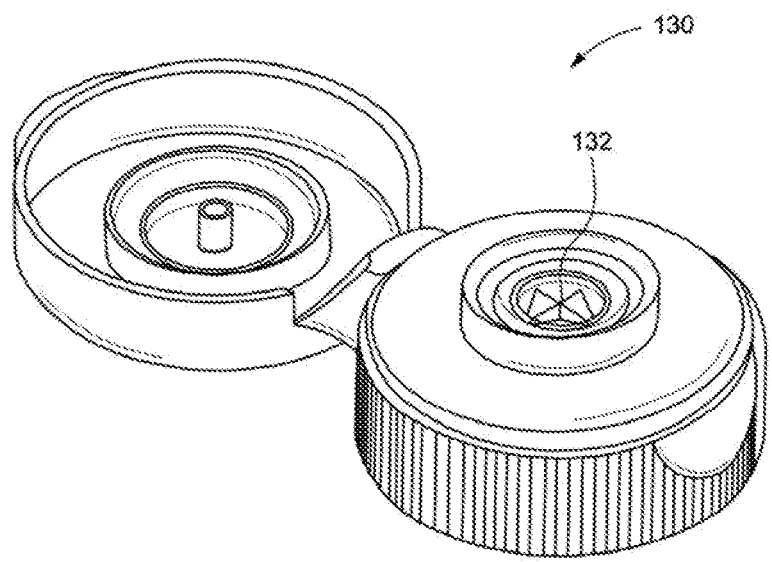
FIG. 20 shows an alternative closure for the container, the alternative closure comprising a self-sealing cap.

Referring to FIG. 19, in one embodiment a twist lock 128 may be employed at the junction of the cap 112 and syringe 14 to ensure to locking connection that avoids spilling hair color product 104. Referring to FIG. 20, alternatively, a self-sealing cap 130 may be used incorporating features such as a silicon valve closure 132, thereby allowing the syringe 14 to withdraw hair color product 104 and be removed from the container 100 without spilling or dripping.

Although preferred embodiments of the present invention have been shown and described, various modifications and substitutions may be made thereto without departing from the spirit and scope of the invention. For instance, in place of a luer-lock, another hermetically re-sealable locking connector may be used. Accordingly, it is to be understood that the invention has been described by way of illustration and not limitation.

What is claimed is:

1. An apparatus for preparing a hair coloring comprising:
   a graduated measuring and dispensing vessel;
   a flexible packaging pouch container having a hair dye product contained therein, the pouch container comprising an air-tight chamber and an opening;
   a self-sealing valve provided with a closure cap and dispensing orifice, located at the opening of the pouch container and capable of receiving the measuring and dispensing vessel, such that when the measuring and dispensing vessel engages with the self-sealing valve, the hair dye products may be extracted from the air-tight chamber via the dispensing orifice, and when the measuring and dispensing vessel is disengaged from the self-sealing valve, the dispensing orifice closes, thereby sealing the air-tight chamber;
   a quick-acting coupling mechanism configured such that the self-sealing valve serves as the female socket end, and the graduated measuring and dispensing vessel serves as the male plug end; and
   thereby permitting a known quantity of the hair dye product to be withdrawn from the pouch container into the measuring and dispensing vessel, allowing an accurate and repeatable quantity of hair dye to be dispensed from the pouch container.

2. The apparatus of claim 1 wherein 1 wherein the graduated measuring and dispensing vessel is shaped as a syringe provided with an extraction/dispensing end having an opening of a predetermined diameter which is capable of both effectively penetrating through the self-sealing dispensing orifice of the self-sealing valve and into the air-tight chamber of the container, and efficiently withdrawing product from inside the container.

3. The apparatus of claim 2 wherein the extraction/dispensing end is shaped like a tip and integrally connected to the vessel.

4. The apparatus of claim 3 wherein the tip is removably/interchangeably connected to the vessel and comes in various configurations and diameters.

5. The apparatus of claim 1 wherein the flexible packaging pouch container is made from a laminate material comprised of multiple layers, at least one of which being aluminum foil.

6. The apparatus of claim 1 wherein the self-sealing valve with cap closure is made from an inert substrate.

7. The apparatus of claim 6 wherein the inert substrate is chosen from a substance selected from the list of rubber and silicone.

8. The apparatus of claim 1 wherein the quick-acting coupling mechanism is chosen from a bayonet coupling that relies on a twist locking arrangement, or a force actuated coupling mechanism comprised of a lip/flange on the plug end of the vessel that is inserted into the female socket end of the valve, such that when the vessel is pushed into the valve, a seal is formed and the vessel and valve are removably locked in place.

9. A hair coloration kit comprising:
   a graduated measuring and dispensing vessel;
   at least one flexible packaging pouch container having a hair dye product contained therein, the pouch container comprising an air-tight chamber and an opening;
   at least one flexible packaging pouch container having a developer contained therein, the pouch container comprising an air-tight chamber and an opening;
   a self-sealing valve provided with a closure cap and dispensing orifice, located at the opening of the pouch container and capable of receiving the measuring and dispensing vessel, such that when the measuring and dispensing vessel engages with the self-sealing valve, the hair dye products may be extracted from the air-tight chamber via the dispensing orifice, and when the measuring and dispensing vessel is disengaged from the self-sealing valve, the dispensing orifice closes, thereby sealing the air-tight chamber;
   a quick-acting coupling mechanism configured such that the self-sealing valve serves as the female socket end, and the graduated measuring and dispensing vessel serves as the male plug end;
   at least one mixing bowl into which the hair dye product and developer are dispensed;
   at least one mixing tool for mixing the hair dye product and developer in the mixing bowl; and
   thereby permitting a known quantity of the hair dye product and/or developer to be withdrawn from one or more pouch containers into the measuring and dispensing vessel, allowing an accurate and repeatable quantity of hair dye and/or developer to be dispensed from one or more pouch containers.

10. The hair coloration kit of claim 9 further comprising at least one additional flexible packaging pouch container having a different color hair dye product contained therein, such that the two hair dye products, when mixed together and with the developer, form a custom hair color product.

11. An apparatus for preparing an anti-aging treatment composition comprising:
    a graduated measuring and dispensing vessel;
    a flexible packaging pouch container made from an inert substrate that is impervious to UV light and/or ambient air, having at least one anti-aging active compound sensitive to ambient air and/or UV light contained therein, the pouch container comprising an air-tight chamber and an opening;
    a self-sealing valve provided with a closure cap and dispensing orifice, located at the opening of the pouch container and capable of receiving the measuring and dispensing vessel, such that when the measuring and dispensing vessel engages with the self-sealing valve, the anti-aging active compound may be extracted from the air-tight chamber via the dispensing orifice, and when the measuring and dispensing vessel is disengaged from the self-sealing valve, the dispensing orifice closes, thereby sealing the air-tight chamber;

a quick-acting coupling mechanism configured such that the self-sealing valve serves as the female socket end, and the graduated measuring and dispensing vessel serves as the male plug end; and thereby permitting a known quantity of the anti-aging compound to be withdrawn from the pouch container into the measuring and dispensing vessel, allowing an accurate and repeatable quantity of anti-aging compound to be dispensed from the pouch container.

12. The apparatus of claim 11 wherein the graduated measuring and dispensing vessel is shaped as a syringe provided with an extraction/dispensing end with an opening having a predetermined diameter that is capable of both effectively penetrating through the self-sealing dispensing orifice of the self-sealing valve into the air-tight chamber of the pouch container, and efficiently withdrawing product from inside the pouch container.

13. The apparatus of claim 12 wherein the extraction/dispensing end is shaped like a tip and integrally connected to the vessel.

14. The apparatus of claim 13 wherein the tip is removably/interchangeably connected to the vessel and comes in various configurations and diameters.

15. The apparatus of claim 11 wherein the flexible packaging pouch container is made from a laminate material.

16. The apparatus of claim 11 wherein the self-sealing valve with closure cap is made from an inert substrate.

17. The apparatus of claim 16 wherein the inert substrate is chosen from a substance selected from the list of rubber and silicone.

18. The apparatus of claim 11 wherein the quick-acting coupling mechanism is chosen from a bayonet coupling that relies on a twist locking arrangement, or a force actuated coupling mechanism comprised of a lip/flange on the plug end of the vessel that is inserted into the female socket end of the valve, such that when the vessel is pushed into the valve, a seal is formed and the vessel and valve are removably locked in place.

19. The apparatus of claim 11 wherein the anti-aging compound is an antioxidant.

20. The apparatus of claim 19 wherein the antioxidant is chosen from vitamin C, resveratrol, retinol, ferulic acid and mixtures thereof.

21. An anti-aging treatment kit comprising:
a graduated measuring and dispensing vessel;
at least one flexible packaging pouch container made from an inert substrate that is impervious to UV light and ambient air having at least one anti-aging active compound sensitive to ambient air and/or UV light contained therein, the pouch container comprising an air-tight chamber and an opening;
a self-sealing valve provided with a closure cap and dispensing orifice, located at the opening of the pouch container and capable of receiving the measuring and dispensing vessel, such that when the measuring and dispensing vessel engages with the self-sealing valve, the anti-aging compound may be extracted from the air-tight chamber via the dispensing orifice, and when the measuring and dispensing vessel is disengaged from the self-sealing valve, the dispensing orifice closes, thereby sealing the air-tight chamber;
a quick-acting coupling mechanism configured such that the self-sealing valve serves as the female socket end, and the graduated measuring and dispensing vessel serves as the male plug end;
optionally, at least one bowl into which the anti-aging compound may be dispensed; and
thereby permitting a known quantity of the anti-aging compound to be withdrawn from the pouch container into the measuring and dispensing vessel, allowing an accurate and repeatable quantity of anti-aging compound to be dispensed from the pouch container.

22. The kit of claim 21 further comprising at least one additional flexible packaging pouch container having a different anti-aging active compound contained therein, such that the two anti-aging compounds, when mixed together, form a custom anti-aging treatment product.

* * * * *